United States Patent
Majer

(10) Patent No.: US 8,960,212 B2
(45) Date of Patent: Feb. 24, 2015

(54) HAIL GUARD FOR CARS

(76) Inventor: Edoardo Majer, Cappella Maggiore (IT)

( * ) Notice: Subject to any disclaimer, the term of this patent is extended or adjusted under 35 U.S.C. 154(b) by 0 days.

(21) Appl. No.: 14/347,653

(22) PCT Filed: Oct. 25, 2011

(86) PCT No.: PCT/IB2011/054750
§ 371 (c)(1),
(2), (4) Date: Mar. 27, 2014

(87) PCT Pub. No.: WO2013/045979
PCT Pub. Date: Apr. 4, 2013

(65) Prior Publication Data
US 2014/0238455 A1 Aug. 28, 2014

(30) Foreign Application Priority Data

Sep. 27, 2011 (IT) .............................. PD2011A0304

(51) Int. Cl.
*B60J 11/04* (2006.01)
*B60J 11/00* (2006.01)
*B65D 71/14* (2006.01)

(52) U.S. Cl.
CPC *B60J 11/04* (2013.01); *B60J 11/00* (2013.01); *B65D 71/14* (2013.01); *B65D 2571/0045* (2013.01); *B65D 2571/00493* (2013.01); *B65D 2571/0066* (2013.01); *B65D 2571/00666* (2013.01); *B65D 2571/00716* (2013.01); *B65D 2571/0079* (2013.01); *Y10S 135/907* (2013.01)
USPC ........ 135/88.07; 135/907; 160/377; 160/378; 160/370.21; 296/136.02; 296/136.12

(58) Field of Classification Search
CPC ....................................................... B60J 11/04
USPC ................... 135/88.05, 88.07, 139, 143, 907; 150/166; 160/377, 378, DIG. 2, 370.21, 160/368.1; 296/136.01, 136.02, 136.1, 296/136.12
See application file for complete search history.

(56) References Cited

U.S. PATENT DOCUMENTS

| | | | | | |
|---|---|---|---|---|---|
| 2,403,661 | A | * | 7/1946 | Hurley | 160/328 |
| 2,571,362 | A | * | 10/1951 | Hervey | 135/134 |
| 3,156,497 | A | * | 11/1964 | Lessard | 296/95.1 |
| 3,221,756 | A | * | 12/1965 | Rupright | 135/98 |
| 3,957,301 | A | * | 5/1976 | Huber | 296/95.1 |
| 4,858,985 | A | * | 8/1989 | Wojcik | 296/136.03 |
| 6,257,259 | B1 | * | 7/2001 | Ardouin | 135/88.07 |
| 8,800,581 | B1 | * | 8/2014 | McMaster | 135/88.05 |
| 2009/0072578 | A1 | * | 3/2009 | Wang | 296/136.12 |

FOREIGN PATENT DOCUMENTS

| | | |
|---|---|---|
| AU | 724718 | 9/2000 |
| DE | 10214698 | 10/2003 |
| EP | 1522446 | 4/2005 |

* cited by examiner

*Primary Examiner* — Robert Canfield
(74) *Attorney, Agent, or Firm* — Themis Law

(57) ABSTRACT

A hail guard for cars includes a net with a thick mesh applied to a structure having two center rods joined by a hinge, two multiple hinges applied to the free ends of the center rods, and four net-stretching rods hinged to each multiple hinge. Each multiple hinge has pins with vertical axes suited to allow the net-stretching rods to rotate and a rotation pin whose horizontal axis is orthogonal to the center rods, suited to allow the rotation of the set of net-stretching rods. The net-stretching rods are arranged so that two of them, when open, are opposed to each other and two other ones are generically diagonal. Two or more supports are hinged to the center rods and each free end of each support is provided with suction cups or magnets suited to allow the structure to be stably and removably applied to the car roof.

10 Claims, 4 Drawing Sheets

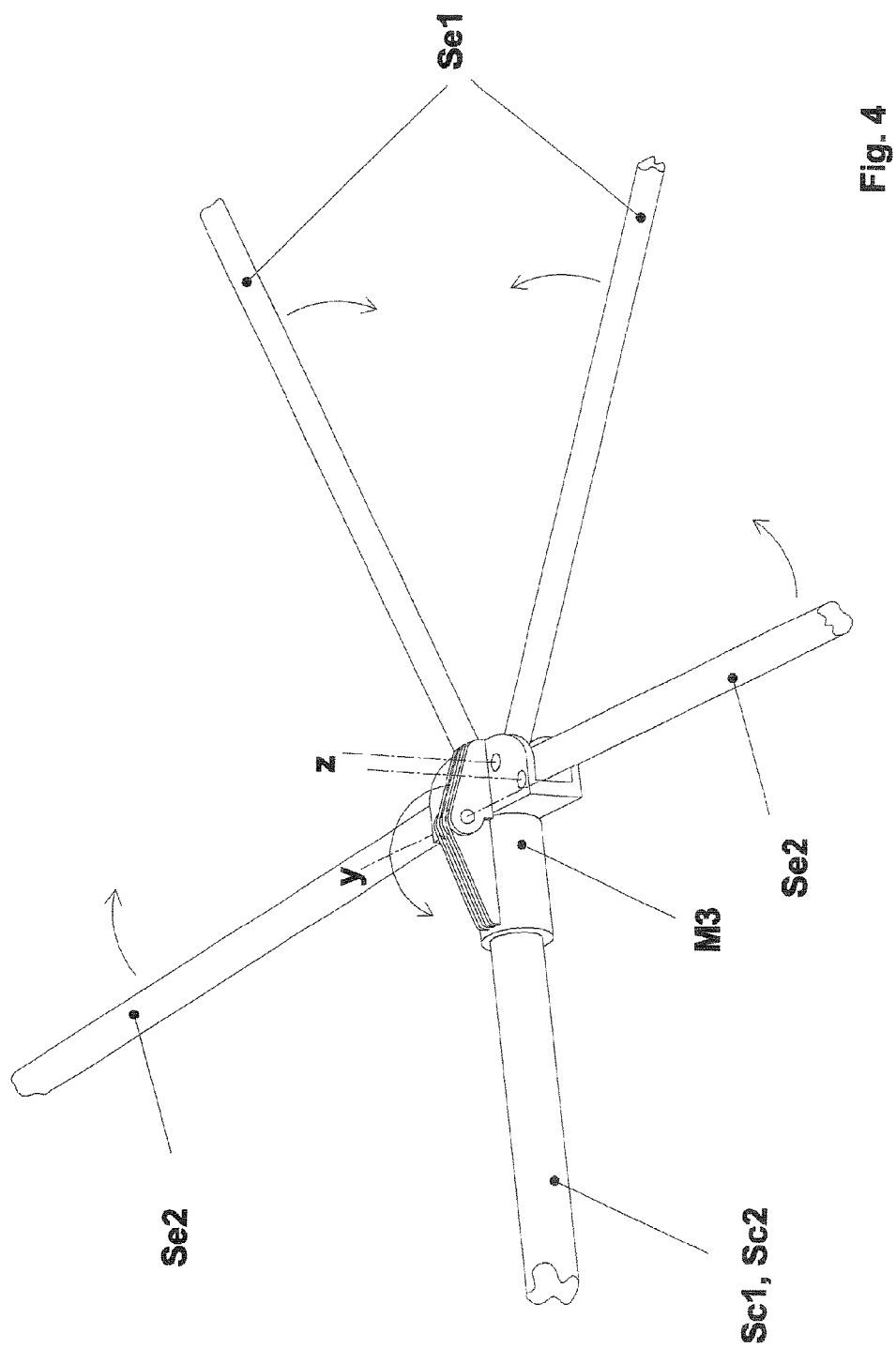

HAIL GUARD FOR CARS

FIELD OF THE INVENTION

This patent is related to hail protective covers for cars and vehicles in general.

BACKGROUND OF THE INVENTION

Cars are continuously exposed to weather agents, both during use and when parked in public areas.

The bodywork of cars is designed and built to withstand weather like frost, rain, and sun, but is affected by the action of hail.

Small hailstones, with low kinetic energy, bounce on the body without damaging it.

Larger hailstones, however, seriously damage the body forcing the owner to make costly repairs.

Usually motorists try to protect the car by sheltering it under bridges, overpasses or porticoes in the vicinity.

Sometimes it is not possible to find shelter for the car due to the lack of shelters in the vicinity or the traffic conditions that do not permit shelter to be reached.

SUMMARY OF THE INVENTION

To overcome all these drawbacks a new hail guard for cars was designed and constructed.

One purpose of the new hail guard is to protect the car from hail regardless of whether there are suitable places of shelter in the vicinity.

Another purpose of the new hail guard is to enable the quick and easy installation and arrangement on the car to be protected.

Another purpose of the new hail guard is to enable the easy storage in the trunk of the car when not in use.

These and other purposes, direct and complementary, are achieved by the new hail guard for cars comprising a rod structure to which a thick mesh that covers the entire car is fixed.

The rod structure is collapsible and is equipped with suction cups, magnets or other systems for its application on the roof of the car.

At the free end or near the free end of each rod the rod structure is equipped with elastic cords with hooks to fasten it to the lower edges of the car.

The thick mesh is fixed to said rod structure in several places, preferably at least at each free end of each rod.

BRIEF DESCRIPTION OF THE DRAWINGS

The characteristics of the new hail guard will be better clarified by the following description with reference to the attached drawings by way of a non-limiting example.

FIG. 4 illustrates in detail the multiple hinge between the net-stretching rods and a center rod in the guard of FIG. 1.

DETAILED DESCRIPTION OF EMBODIMENTS OF THE INVENTION

Figure 1:
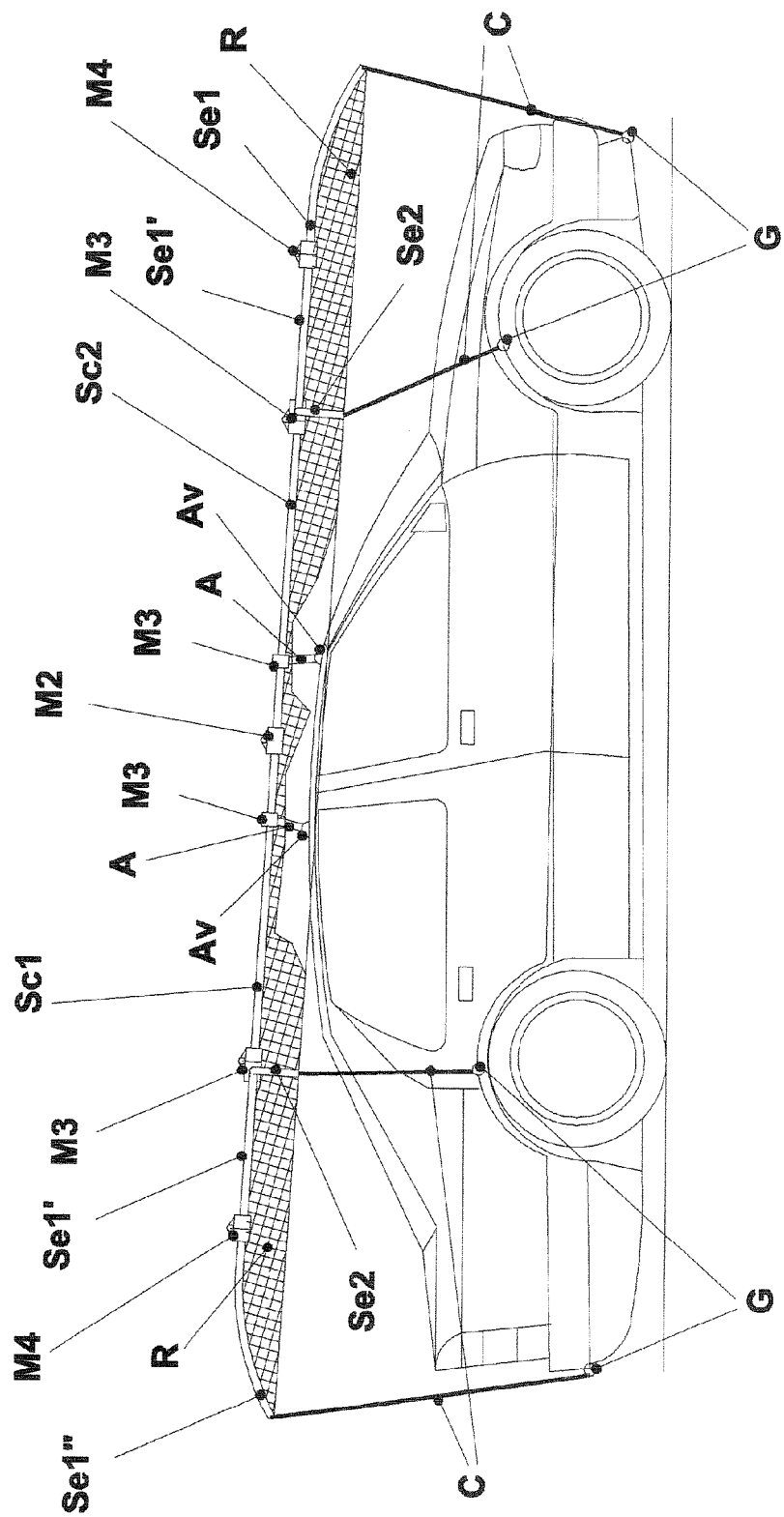
FIG. 1 illustrates a side view of a guard according to the invention applied to a car.
Figure 2:
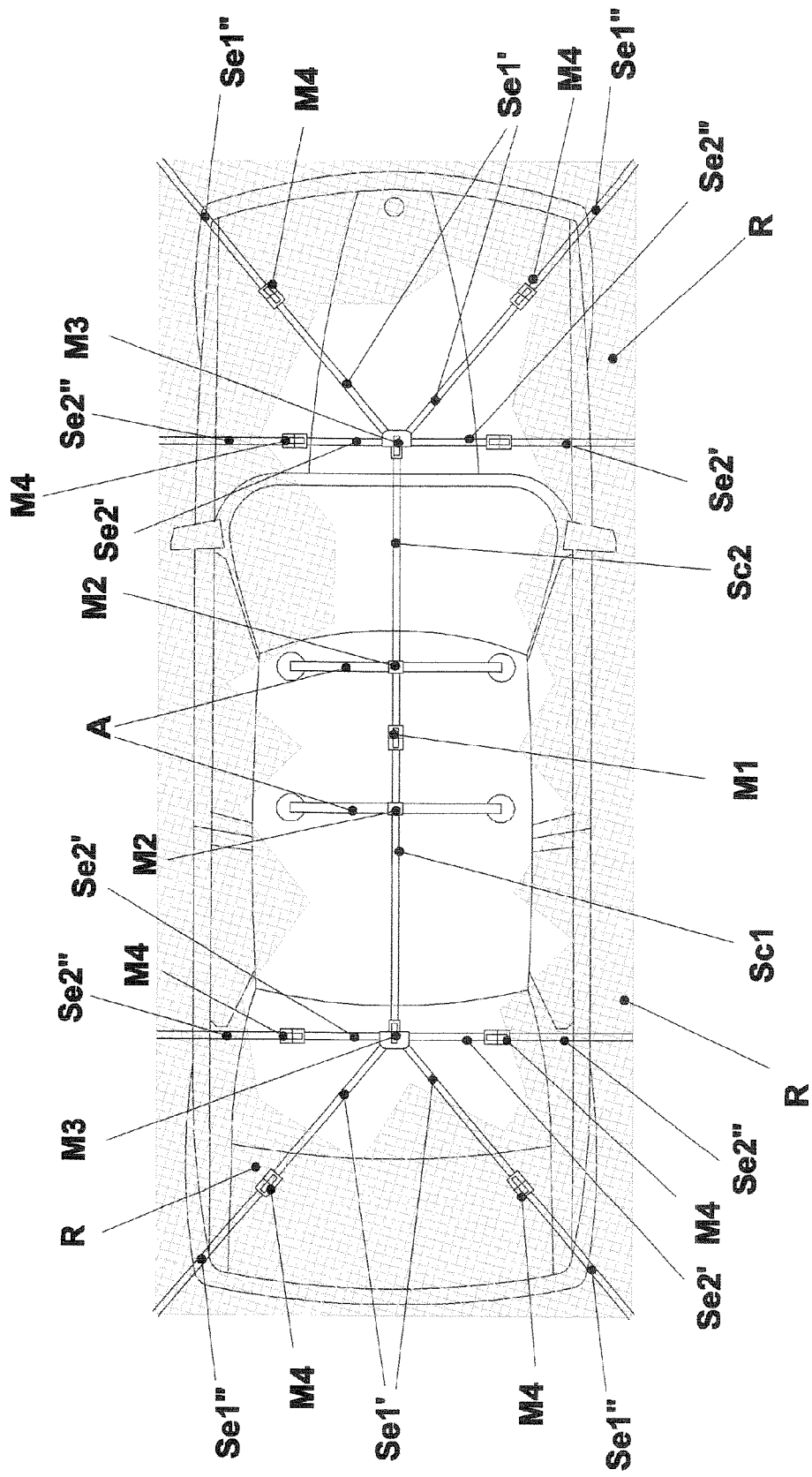
FIG. 2 illustrates a plan view of the guard of FIG. 1.

FIG. 1 illustrates a side view of the new guard applied to a car while FIG. 2 illustrates a plan view.

The new hail guard comprises a structure consisting of several elements (Sc1, Sc2, Se1, Se2), applicable to the roof of the car, and a thick mesh (R). The structure consists of several rods (Sc1, Sc2, Se1, Se2) hinged together. In particular this structure, when opened, comprises in its main parts two center rods (Sc1, Sc2) hinged opposing each other and substantially aligned with each other and the direction of movement of the car having at each free end at least four net-stretching rods (Se1, Se2) arranged radially with respect to the end of the center rods (Sc1, Sc2).

The center rods (Sc1, Sc2) are joined by a hinge (M1) with a horizontal rotation axis.

Each center rod (Sc1, Sc2) has, along its length and in a generally middle position, a joint (M2) supporting two supports (A) to rest on the car. Each joint (M2) allows the rotation of the supports (A) from a generally vertical position downward to a position substantially parallel to and alongside the center rod (Sc1, Sc2).

Figure 3:
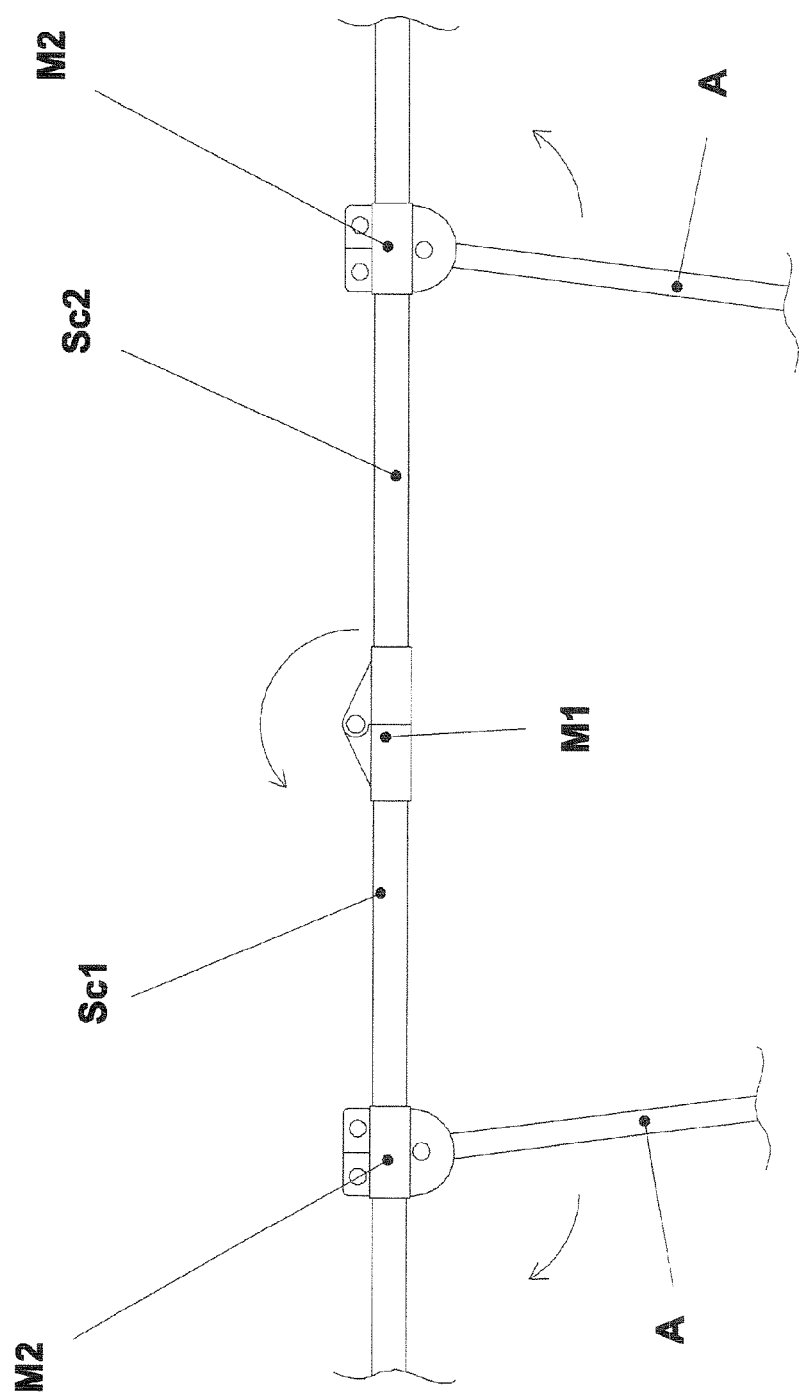
FIG. 3 illustrates in detail the hinge between the two center rods and the joints of the supports in the guard of FIG. 1.

FIG. 3 shows the hinge (M1) between the two center rods (Sc1, Sc2) and the joints (M2) of the supports (A) in detail.

Each of these supports (A) has, at the free end, suction cups or magnets (Av) suited to allow the structure to be stably and removably applied to the roof of the car.

Each support (A) can be telescopic and adjustable in length so as to allow a better adjustment of the structure and new guard on the car.

The net-stretching rods (Se1, Se2) are joined to the end of each center rod (Sc1, Sc2) by a multiple hinge (M3).

FIG. 4 illustrates in detail the multiple hinge (M3) between the net-stretching rods (Se1, Se2) and a center rod (Sc1, Sc2).

This multiple hinge (M3) is such as to obtain the rotation of each net-stretching rod (Se1, Se2) around a vertical axis (z), and the rotation of all net-stretching rods (S1, Se2) arranged around a horizontal axis (y) orthogonal to the center rod (Sc1, Sc2).

This multiple hinge (M3) allows the rotation of the net-stretching rods (Se1, Se2) around their vertical axes from an open position arranged semi-radially around the multiple hinge (M3), to a closed position arranged alongside and in alignment with the center rod (Sc1, Sc2).

In the open position two net-stretching rods (Se1) are opposed, aligned and orthogonal to the center rod (Sc1, Sc2), while the other two net-stretching rods (Sc2) are generally arranged in a diagonal position in an opposite direction with respect to said center rod (Sc1, Sc2).

Each of the net-stretching rods (Se1, Se2) is in turn divided into two portions (Se1', Se1", Se2', Se2") joined together by a hinge (M4) featuring a horizontal axis.

In addition, the innermost portions (Se1', S2') of said net-stretching rods (Se1, Se2) are linear and the outermost portions (Se1", Se2") of said net-stretching rods (Se1, Se2) are curved downwards.

Hooks or fixing elements suited to hold each outer portion (Se1", Se2") of the net-stretching rods (Se1, Se2) alongside and joined to the respective inner portion (Se1', Se2') are also foreseen.

One or both portions (Se1', Se1", Se2', Se2") of each net-stretching rod (Se1, Se2) may be extensible, so as to enable the adaptation to and coverage of larger or smaller cars.

When the new hail guard is applied to the car, the two center rods (Sc1, Sc2) are aligned and opposing each other as well as arranged in the direction of movement of the car, while the net-stretching rods (Se1, Se2) are oriented laterally, generally towards the wheels and corners of the car.

On this structure (Sc1, Sc2, Se1, Se2) the thick mesh (R) which consists of a mesh made of lightweight and durable plastic material is applied.

This mesh (R) is preferably only attached to the free ends of the net-stretching rods (Se1, Se2) so as to be raised from the car's roof and extend its coverage around the car.

The edge of the mesh (R) is equipped with elastic cords (C) with hooks (G) at their ends to allow the attachment of the edge of the mesh (R) to the mudguards or other parts of the car.

To install the new hail guard on a car it is necessary to:

rotate the supports (A) on their joints (M2) opening them away from the center rods (Sc1, Sc2) and putting them into a working position;

rotate the two center rods (Sc1, Sc2) around their hinge (M1) aligning them opposite each other;

place the new device on the roof of the car so that the suction cups or magnets (AV) of the supports (A) rest on the roof of the car;

rotate each group of net-stretching rods (Se1, Se2) on its multiple hinge (M3) so as to bring them from a position generally alongside the center rod (Sc1, Sc2), to a position generally aligned opposite to said center rod (Sc1, Sc2);

rotate each net-stretching rod (Se1, Se2) on the multiple hinge (M3) arranging the net-stretching rods (Se1, Se2) in a semi-circle so that the net (R) is correctly placed on the car;

finally, fix the hooks (G) of the elastic cords (C) to the mudguards or other parts of the car so as to maintain the mesh (R) and rods (Sc1, Sc2, Se1, Se2) of the structure relatively tight.

A hail guard according to the invention can also be kept mounted on the car in a half-open mode, with each outer portion (Se1", Se2") of each net-stretching rod (Se1, Se2) folded and attached to the relative inner portion (Se1', Se2'). In this way the car can travel at limited speeds having the new guard already partly prepared in view of a possible impending hailstorm.

When a hail guard according to the invention is no longer needed simply release the hooks (G) of the elastic cords (C), fold the various net-stretching rods (Se1, Se2), fold each group of net-stretching rods (Se1, Se2) around the multiple hinges (M3), fold the center semi-rods (Sc1, Sc2) and fold the supports (A).

The new hail guard constituted as described above allows the car to be to fully protected from hail.

The net-stretching rods (Se1, Se2) of the new guard, in fact, maintain the mesh (R) sufficiently stretched and distanced from the bodywork of the car. Hailstones, even if large and at high speed, are stopped by the mesh (R). The application and removal of the new hail guard are quick and easy enabling the rapid installation of the new hail guard in case of hail, and enabling it to be put away just as quickly when no longer needed.

Therefore, with reference to the preceding description and the attached diagrams, the following claims are made.

The invention claimed is:

1. A hail guard for cars, comprising a net (R) with a thick mesh applied to rods, the hail guard comprising:
   two center rods (Sc1, Sc2) joined by a hinge (M1) first ends of the center rods;
   two multiple hinges (M3) applied to second ends of said center rods (Sc1, Sc2), each hinge being configured to rotate on at least two axes orthogonal to each other and orthogonal to the center rods (Sc1, Sc2); and
   a set comprising four net-stretching rods (Se1, Se2) hinged to each multiple hinge (M3),
   wherein each multiple hinge (M3) comprises four or more pins whose vertical axes (z) are orthogonal to the center rods (Sc1, Sc2), said pins being configured to allow said net-stretching rods (Se1, Se2) to rotate, and a rotation pin whose horizontal axis (y) is orthogonal to the center rods (Sc1, Sc2), said rotation pin being configured to allow a rotation of the set of four net-stretching rods (Se1, Se2).

2. The hail guard for cars according to claim 1, wherein the set of four net-stretching rods (S1, Se2) is arranged so that at least two net-stretching rods of the set (Se2), when open, are opposed and orthogonal to the center rods (Sc1, Sc2) and other two net-stretching rods of the set (Se1) are generically diagonal.

3. The hail guard for cars according to claim 1, further comprising two or more supports (A) hinged to said center rods (Se1, Se2), wherein said two or more supports have free ends, and wherein each free end of each one of said supports is provided with a suction cup or a magnet (Av) configured to allow the hail guard to be stably and removably applied to a car roof.

4. The hail guard for cars according to claim 3, wherein said supports (A) are telescopic and adjustable in length.

5. The hail guard for cars according to claim 1, wherein each net-stretching rod (Se1, Se2) is comprises at least two sections (Se1', Se1", Se2', Se2") hinged to each other by a hinge (M4) with a horizontal rotation axis.

6. The hail guard for cars according to claim 5, wherein innermost portions (Se1', Se2') of said net-stretching rods (Se1, Se2) are linear and wherein outermost portions (Se1", Se2") of said net-stretching rods (Se1, Se2) are curved downwards.

7. The hail guard for cars according to claim 5, wherein one or both of innermost portions (Se1', S2') or outermost portions (Se1", Se2") of said net-stretching rods (Se1, Se2) are telescopic and adjustable in length.

8. The hail guard for cars according to claim 5, further comprising hooks or fixing elements configured to hold each outer portion (Sel", Se2") of the net-stretching rods (Se1, Se2) beside and joined to a corresponding inner portion (Se1', Se2').

9. The hail guard according to claim 1, further comprising cables or elastic cords (C) with hooks (G) joined to said net-stretching rods (Se1, Se2) and configured to ensure that a bodywork of a car is protected against hail.

10. The hail guard according to claim 9, wherein each hook (G) comprises a coated rod iron or metal wire shaped as two parallel Us placed side by side and joined at one end at a connection section, and wherein a cable or elastic cord (C) is joined to said connection section of said hook (G).

* * * * *